(No Model.) 3 Sheets—Sheet 1.
C. E. VAWTER.
PERPETUAL CALENDAR.
No. 529,979. Patented Nov. 27, 1894.
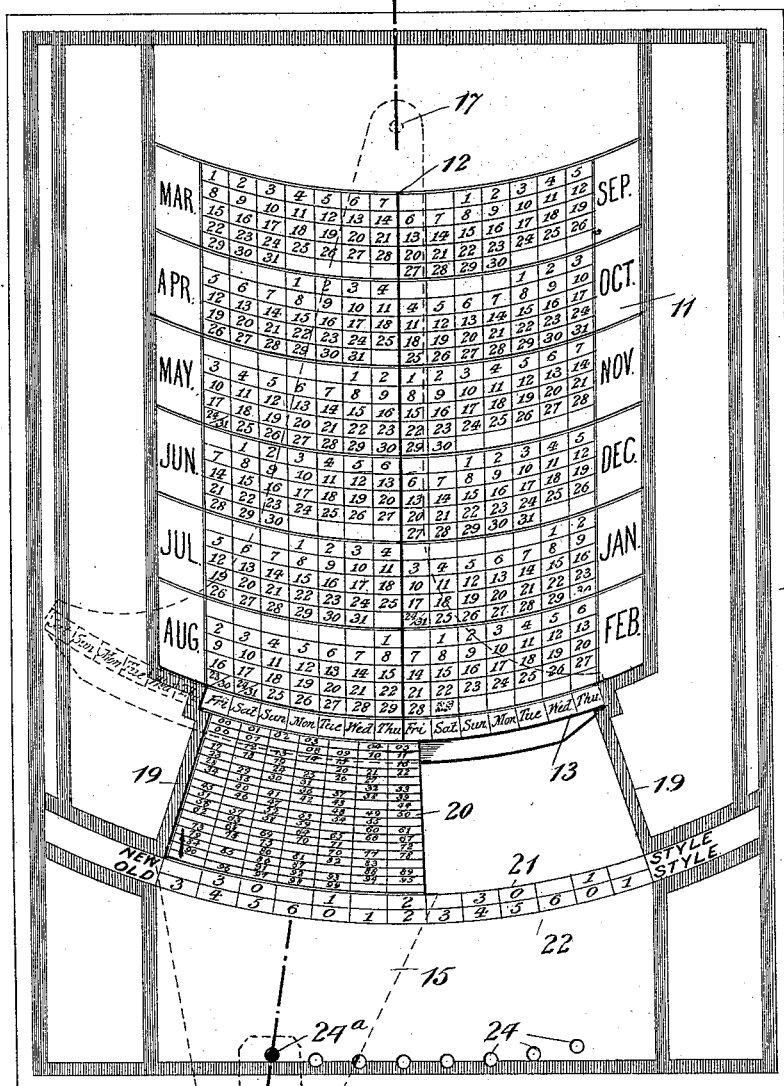
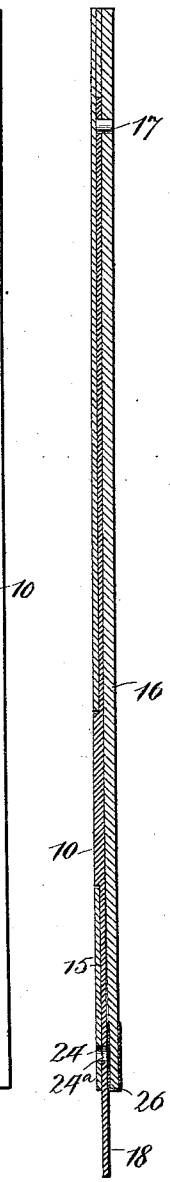
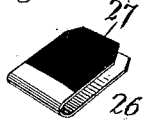
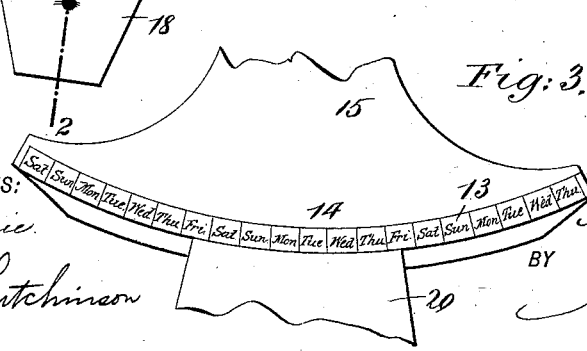
WITNESSES:
INVENTOR
BY
ATTORNEYS.

(No Model.) 3 Sheets—Sheet 2.

C. E. VAWTER.
PERPETUAL CALENDAR.

No. 529,979. Patented Nov. 27, 1894.

WITNESSES:
John A. Rennie
W. P. Hutchinson

INVENTOR
C. E. Vawter
BY
Munn & Co.
ATTORNEYS.

(No Model.) 3 Sheets—Sheet 3.

C. E. VAWTER.
PERPETUAL CALENDAR.

No. 529,979. Patented Nov. 27, 1894.

WITNESSES:
John A. Rennie
W. B. Hutchinson

INVENTOR
C. E. Vawter
BY
Munn & Co.
ATTORNEYS.

UNITED STATES PATENT OFFICE.

CHARLES E. VAWTER, OF CROZET, VIRGINIA.

PERPETUAL CALENDAR.

SPECIFICATION forming part of Letters Patent No. 529,979, dated November 27, 1894.

Application filed May 4, 1894. Serial No. 510,035. (No model.)

*To all whom it may concern:*

Be it known that I, CHARLES E. VAWTER, of Crozet, in the county of Albemarle and State of Virginia, have invented a new and Improved Perpetual Calendar, of which the following is a full, clear, and exact description.

My invention relates to improvements in perpetual calendars; and the object of my invention is to produce a very simple and inexpensive calendar, which may be easily and immediately adjusted for any year, which, when adjusted is good for the whole year, which requires no figuring with pencil or pen to know how to adjust it or to ascertain a given day or date, which is adjusted as easily for one date as another, and which enables any particular year or day of any year in the Christian era to be accurately and quickly determined.

To these ends my invention consists of a perpetual calendar, the construction and arrangement of which will be hereinafter described and claimed.

Reference is to be had to the accompanying drawings, forming a part of this specification, in which similar figures of reference indicate corresponding parts in all the views.

Figure 8:
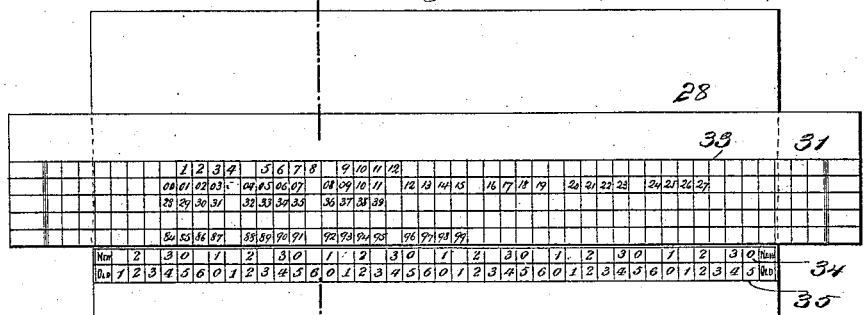
Figure 9:
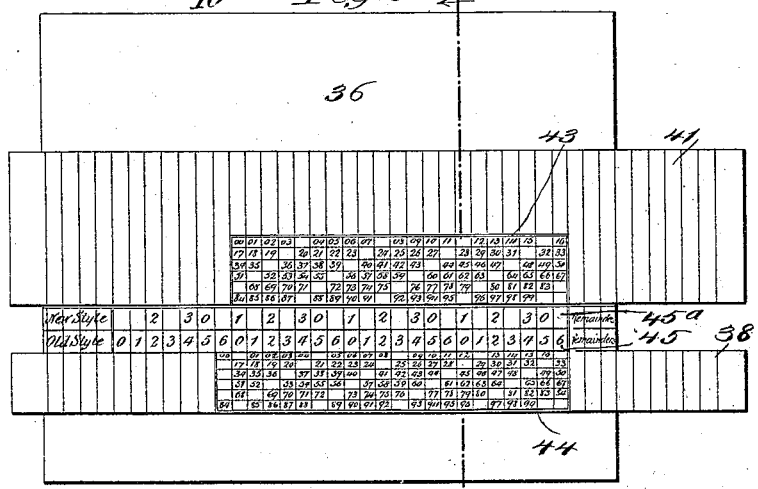
Figure 10:
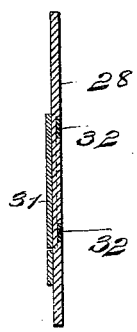
Figure 11:
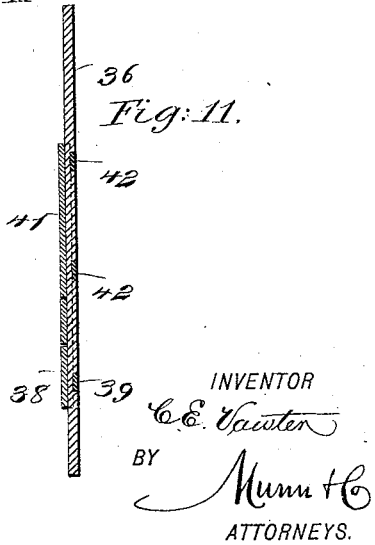

Figure 1 is a front elevation of the calendar embodying my invention. Fig. 2 is a longitudinal section on the line 2—2 of Fig. 1. Fig. 3 is a broken detail elevation of a portion of the removable part of the calendar, showing the segment on which the days of the week appear. Fig. 4 is a perspective view of an indicating clip which may be used in connection with the calendar to enable the calendar to be instantly set for the current year. Fig. 5 is a front elevation of a modified form of the calendar, having the days of the week and the year terminals arranged on a transversely movable slide. Fig. 6 is a front view of another modification of the calendar, having two slides. Fig. 7 is a front view of still another modification of the calendar, showing the days of the week and the year terminals on the front of a transversely movable slide. Fig. 8 is a rear view of the calendar shown in Fig. 5. Fig. 9 is a rear view of the calendar shown in Fig. 6. Fig. 10 is a cross section on the line 10—10, of Fig. 8; and Fig. 11 is a cross section on the line 11—11 of Fig. 9.

The calendar is provided with a face plate 10, which may be made of any suitable material and gotten up in any desired style, and on the front of the plate are arranged the months of the year, these being placed in two vertical groups appropriately marked as shown at 11, and the days of each month are arranged opposite them in the customary manner, and the groups of dates are separated by a central vertical line 12. Below these date numbers are arranged, as shown at 13, the days of the week, these being made on a segment 14 of the movable piece 15, which is hung between the face plate 10 and the back plate 16, the movable piece 15 being pivoted at a point near the top of the calendar, as shown at 17, but it may be arranged in any way which will permit it to be moved transversely across the calendar so as to bring the numbers thereon in alignment with the date numbers, as hereinafter described.

The lower end of the piece 15 is reduced, as shown at 18, and this reduced end projects below the bottom of the calendar so as to serve as a handle by which the piece 15 may be moved from side to side. The piece 15 swings in a recess 19 in the calendar, and the face plate is open from the lower date numbers to the rows of numbers 21 and 22 so as to expose the table 20 on the piece 15.

The segment 14 is wider than the open portion of the calendar and also wider than the combined width of the date groups, so that the days may be brought under the desired dates, and the days are regularly arranged in spaces whose width corresponds with the width of the spaces between the dates and corresponds also with the width of the columns on the table 20. This table being produced on the piece 15, of course, has the same relation to the names of the days, but the table may be shifted with relation to the date numbers and to the rows of spaces 21 and 22, which are arranged beneath the table and on the face plate 10.

The table 20 is divided into seven or multiple of seven columns corresponding to the number of days of the week, and in the columns are arranged the last two figures of the various years, the numbers running from 00 to 99, and they are disposed so as to bear the proper relation to the date numbers when placed above the rows of numbers 21 or 22, as hereinafter described. The numbers in the upper row 21 run from 0 to 3 and represent the remainders obtained by dividing all but the last two figures of a date by four and are for use in finding dates under the "new style" calendar, while the row 22 has numbers running from 0 to 6 representing remainders obtained by dividing all but the last two figures of a date by seven and are the "old style" calendar, that is prior to September 14, 1752.

The movable piece 15 is perforated near the bottom as shown at $24^a$, which perforation is adapted to register with the perforations 24 of the face plate; and to enable the calendar to be quickly set for the current year, and readily seen when set, a clip 26 is used, which is of U-shape and is provided with a black or other strikingly-colored side 27, and this is slipped over the bottom of the back plate 16, so that the black side will cover one of the holes 24, and the clip is placed in such a manner that when the hole $24^a$ aligns with the covered hole 24 the calendar will be set for the current year. The black or other color showing through the hole 24 enables the said hole to be quickly located and the piece 15 easily placed, and also shows at a glance whether the calendar is adjusted for the current year.

The directions for using the calendar are preferably printed on the face plate, and are, in substance, as follows: "To set the calendar for twelve months, beginning with March 1, of any year in the Christian era, place the last two figures of the required year on the table 20, over the remainder obtained by dividing the rest of the date by four, for new style calendar, or by seven for old style calendar. For January and February, the calendar should be set for the previous year."

To make the manner of setting the calendar clearly understood, an example of how it is used under the old and new styles is here given. Supposing it is desired to find out on what day of the week July 4, 1860, occurred. This date was, of course, under the new style, and consequently the first two figures of the date, which are 18, are divided by four, which leaves a remainder of two, consequently the piece 15 is turned until the last two figures of the date are directly over the 2, and then the calendar will be set for the year 1860, and, by reference to the date numbers and the names of the days of the week, it will be found that the specified date fell on Wednesday. To find an old date, as for instance, the date of the landing of Columbus, October 12, 1492, the piece 15 is moved until the last two numbers 92 of the date are moved opposite the remainder obtained by dividing fourteen by seven, and as there is no remainder the number 92 is turned opposite or above the 0 in the lower row 22 of numbers, and by reference to the calendar it will be seen that the said date was on Friday.

It is obvious that the days, months, year numbers and remainders may be arranged in many ways without departing from the principle of my invention and, to illustrate this fact, modifications are shown in Figs. 5 to 11.

In Figs. 5 and 8 the plate 28 has the months arranged in horizontal rows 29 with the appropriate tables of dates 30, beneath them. A slide 31 is held to move transversely on the plate, the slide having parallel strips 32 movable near the names of the months and bearing thereon the names of the days of the week. On the back of the slide are the terminals of the century years as shown at 33 in Fig. 8 and just below the slide on the back of the plate 28 are rows 34 and 35 of remainder numbers arranged for "new" and "old style" as above specified.

This calendar may easily be set for the current year by simply moving the slide so as to bring the days of the week into the right relation to the month dates, and to set it for any other year, adjust the slide so that the last two figures of the required year (on the slide) come over the remainder obtained by dividing the rest of the date by four for "new style" or by seven for old style.

The calendar shown in Figs. 6 and 9 has a plate 36 with the months of January and February grouped by themselves thereon, and provided with the tables 37 for the date numerals. A slide 38 is movable transversely on the back of the plate and has a strip 39 extending through a groove in the front of the plate below the months, the slide having thereon the names of the days of the week which may be moved to the desired position by moving the slide. Below the tables 37 are the names of the remaining months of the year, which are arranged in two horizontal rows, with the date tables 40 beneath them, and a slide 41 is placed behind the date tables and provided with strips 42 extending across the calendar just below the names of the months and having on them the names of the days of the week.

The calendar is inverted and reference made to its back when it is to be adjusted for any year except the current year. The slide 38 has on its back a table 44 of the two terminals of the century years as already described, above which is a row 45 of remainders for "old style" also arranged as specified above. Above the row 45 of remainders is a row $45^a$ of remainders for "new style" and above this row and on the back of the slide 41 is the table 43 of century terminals.

The calendar shown in Fig. 7 has a plate 46 with a front opening $46^a$ beneath which is a table 47 of month dates, while on the sides of the opening are the names of the months and numerals indicating the number of days in each month. A slide 48 is movable on the plate and has parallel strips 49 extending across the opening 46ª, these strips having thereon the days of the week and also the century terminals. Just above the opening are the "new style" remainders from 0 to 3 and just below it are the "old style" remainders from 0 to 6. To set this calendar for any year, adjust the slide so that the last two figures of the desired date thereon come under the remainder obtained by dividing the rest of the date by four, for "new style;" or over the remainder obtained by dividing the rest of the date by seven for "old style."

The above examples make it clear that the calendar may be made in many ways so as to have the century terminals and days of the week, movable in relation to the remainders and month dates without affecting the principle of the invention.

Having thus described my invention, I claim as new and desire to secure by Letters Patent—

1. A perpetual calendar, having on its face the months and the dates thereof opposite the names of the months, a double row of figures representing old and new style remainders, as specified, and a movable table arranged between the date groups and the remainder numbers, the table having at the top the days of the week, and on it in columns the two final figures of the years of a century, substantially as described.

2. A perpetual calendar, having on its face the names of the months arranged in double rows and the dates opposite the names, a double row of spaces to mark the remainders of old and new style dates after division, as specified, an opening between the date numbers and the remainder numbers, and a table movable across the opening, the table having at the top the days of the week, and in columns thereon the two final figures of the years of a century, substantially as described.

3. A perpetual calendar, comprising a front plate and back plate, the front plate having thereon the names of the months, the dates of the months arranged opposite the names, an opening beneath the date numbers, and a double row of figures representing old and new style of remainders, as specified, beneath the opening, and a swinging piece arranged behind the front plate and protruding below the said plate, the movable piece having thereon a table, bearing in columns, the two final figures of the years of a century, and adjacent to these figures the days of the week, substantially as described.

4. The combination, with the calendar, having its face lettered and numbered as specified and provided with apertures, of the movable piece bearing the names of the days of the week and the terminal figures of a century's years and having an aperture to register with any one of the first named apertures, and an indicating device movable under and visible through the registering apertures to indicate when the calendar is arranged for the current year, substantially as described.

5. The combination, with the calendar, having its face numbered and lettered as described, and the movable piece also lettered and numbered as specified, of the holes in the face of the calendar, the colored clip adapted to be arranged behind the holes, and the perforated and marked lower end of the movable piece arranged to swing between the colored clip and the perforations in the face of the calendar, substantially as described.

CHARLES E. VAWTER.

Witnesses:
JOHN F. YANCEY,
E. GRANVILLE TAYLOR.